(12) United States Patent  (10) Patent No.: US 8,004,411 B2
Sakama et al.  (45) Date of Patent: Aug. 23, 2011

(54) METHOD FOR MANUFACTURING RADIO FREQUENCY IC TAG AND ANTENNA

(75) Inventors: Isao Sakama, Hiratsuka (JP); Keizo Watanabe, Kawasaki (JP); Minoru Ashizawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 906 days.

(21) Appl. No.: 11/304,777

(22) Filed: Dec. 16, 2005

(65) Prior Publication Data

US 2006/0290514 A1 Dec. 28, 2006

(30) Foreign Application Priority Data

Jun. 22, 2005 (JP) ................................ 2005-181404

(51) Int. Cl.
G08B 13/14 (2006.01)
H01L 35/00 (2006.01)
H01L 23/28 (2006.01)

(52) U.S. Cl. ............... 340/572.7; 340/572.1; 340/572.8; 343/700 R; 257/787

(58) Field of Classification Search .... 340/572.1–572.9; 235/492; 257/679, 787; 343/700 M, 700 R, 343/873, 702, 700 MS
See application file for complete search history.

(56) References Cited

U.S. PATENT DOCUMENTS

| 5,786,626 | A | 7/1998 | Brady et al. | |
| 6,395,373 | B2* | 5/2002 | Conti et al. | 428/138 |
| 6,440,773 | B1* | 8/2002 | Usami | 438/107 |
| 6,942,156 | B2* | 9/2005 | Ohta et al. | 235/492 |
| 2003/0016162 | A1* | 1/2003 | Sasada et al. | 342/70 |
| 2004/0001000 | A1* | 1/2004 | Redlin | 340/572.8 |
| 2004/0026519 | A1 | 2/2004 | Usami et al. | |
| 2004/0031855 | A1 | 2/2004 | Takahashi | |
| 2004/0041262 | A1 | 3/2004 | Okamoto et al. | |
| 2004/0155826 | A1 | 8/2004 | Pecora, Jr. et al. | |
| 2004/0188531 | A1 | 9/2004 | Gengel et al. | |
| 2005/0134460 | A1* | 6/2005 | Usami | 340/572.7 |
| 2006/0164249 | A1* | 7/2006 | Lutz et al. | 340/572.7 |

FOREIGN PATENT DOCUMENTS

| EP | 0 772 154 | 5/1997 |
| EP | 0 952 542 | 10/1999 |
| EP | 1 048 483 | 11/2000 |
| EP | 1 243 442 | 9/2002 |
| EP | 1 605 397 | 12/2005 |
| JP | 9-61520 | 3/1997 |
| JP | 2003-223627 | 8/2003 |
| JP | 2005-56362 | 3/2005 |

* cited by examiner

Primary Examiner — Jennifer Mehmood
Assistant Examiner — Mark Rushing
(74) Attorney, Agent, or Firm — Antonelli, Terry, Stout & Kraus, LLP.

(57) ABSTRACT

A wireless IC tag includes an IC chip with a response circuit for receiving a signal sent from an interrogator and transmitting a response signal in response to the received signal, a rectangular antenna connected to the response circuit, a first protective material hard in nature for covering the IC chip, and a second protective material, softer than the first protective material, for covering at least a part of the antenna, and the antenna is formed in a laminated structure of a plurality of flat members different in toughness so as not to fracture even when the antenna is bent by external forces.

22 Claims, 12 Drawing Sheets

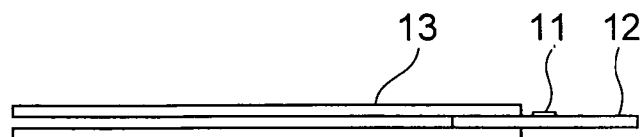
FIG.11A
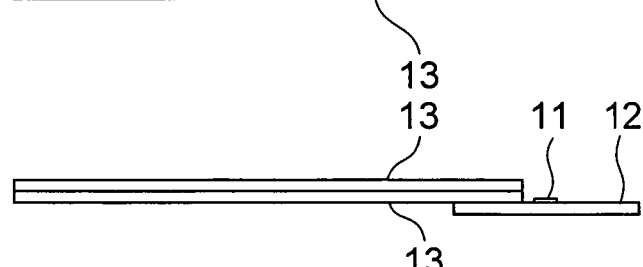
FIG.11B
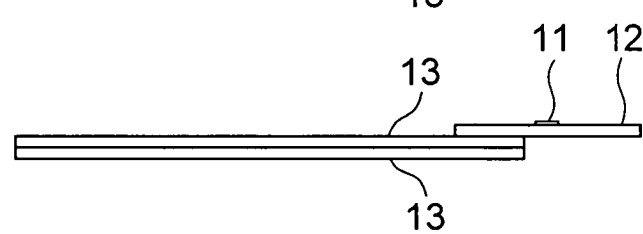
FIG.11C
FIG.12
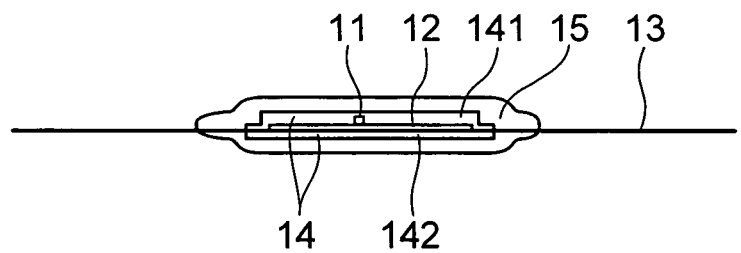
FIG.13
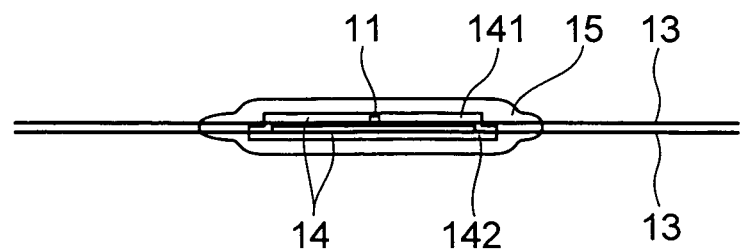

United States Patent US 8,004,411 B2

METHOD FOR MANUFACTURING RADIO FREQUENCY IC TAG AND ANTENNA

INCORPORATION BY REFERENCE

The present application claims priority from Japanese application JP2005-181404 filed on Jun. 22, 2005, the content of which is hereby incorporated by reference into this application.

BACKGROUND OF THE INVENTION

1. Field of the Invention

The present invention relates to a method for manufacturing wireless IC tag with sufficient resistance properties in harsh working conditions, and an antenna for the same wireless IC tag.

2. Description of the Related Art

Wireless IC tags of RFID (Radio Frequency Identification) system are known which, on receiving an interrogation signal sent from the interrogator, returns a reply signal carrying information such as a stored identification number. In addition, among wireless IC tags, there are so-called linen tags for use as a kind of tags which are attached to articles of clothing. As stated in JP-A-9-61520, among linen tags is a rectangular tag formed by gluing a urethane resin layer to both sides of a film-type circuit, which includes an IC chip and a loop antenna, and then coating the whole surfaces of it with a silicon film. JP-A-2005-56362 discloses a button-shaped tag, wherein the housing is formed like a button provided at its portion with a retainer by which a string-like member is fixed.

SUMMARY OF THE INVENTION

A linen tag is exposed to environments at high temperature and high pressure in washing or dry cleaning, for example. Therefore, the linen tag is required to have a structure durable to meet the rigors of harsh and unforgiving environments. If a rectangular linen tag, mentioned above, is treated in a high-speed spin drier (lately, some driers run at a high pressure of 4.4 MPa), for example, there is a possibility that the antenna portion suffers metal fatigue. On the other hand, with button-shaped linen tags, for structural reasons, fracture of the antenna hardly occurs. However, the button type linen tags have a problem that they are likely to come off in centrifugal dewatering, and their shape limits the range of application to certain types of clothing.

The present invention has been made with the above problem in mind and has as its object to provide a method for manufacturing a wireless IC tag and an antenna with sufficient resistance properties even in severe working environments.

In the main invention of the present invention to achieve the above object, a wireless IC tag comprises an IC chip including a response circuit for receiving a signal from the interrogator unit and sending a reply signal in response to the received signal; a rectangular antenna connected to the response circuit; a first protective material of hard nature for covering the IC chip; and a second protective material softer than the first protective material.

In a wireless IC tag of the present invention, the IC chip is protected securely from external forces or the like by the first protective material of soft nature, and the antenna portion, which is susceptible to fracture by bending by external forces, is protected by a second protective material of soft nature which offers less chance of creasing. Therefore, it is possible to provide a wireless IC tag with ample resistance properties in harsh working environments.

According to the present invention, it is possible to realize a wireless IC chip with enough resistance properties even in harsh working environments.

Other objects, features and advantages of the invention will become apparent from the following description of the embodiments of the invention taken in conjunction with the accompanying drawings.

BRIEF DESCRIPTION OF THE DRAWINGS

FIGS. 11A, 11B, and 11C are diagrams showing examples of superposition of a second antenna member 13 and a first antenna member 12 when two pieces of second antenna member 13 are used, which will be described as an embodiment of the present invention;

FIG. 12 is a sectional view of a wireless IC tag 1 formed in such a way that a second protective material 15 covers only the circumference of a first protective material 14, which will be described as an embodiment of the present invention;

FIG. 13 is a sectional view of a wireless IC tag 1 formed in such a way that a second protective material 15 covers only the circumference of a first protective material 14 and that two pieces of second antenna member 13 are used, which will be described as an embodiment of the present invention;

DETAILED DESCRIPTION OF THE INVENTION

Figure 1:
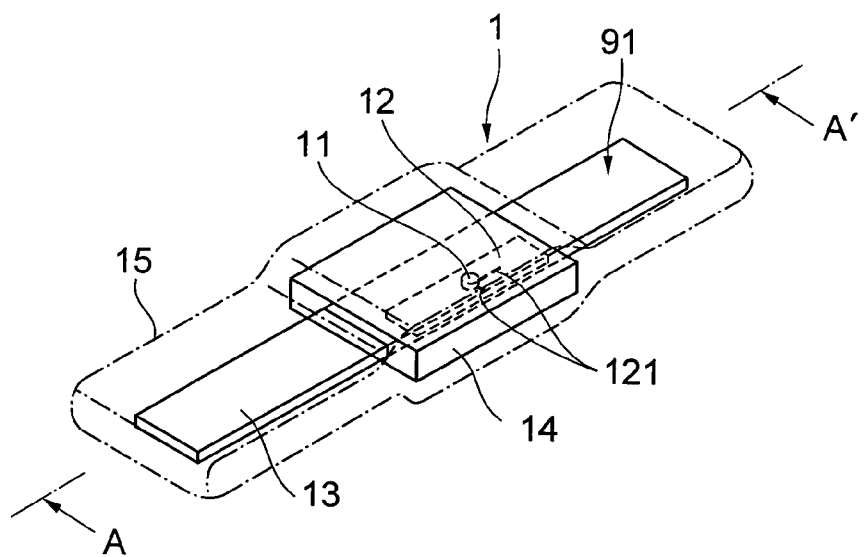
FIG. 1 is a perspective view of a wireless IC tag 1 which will be described as an embodiment of the present invention.
Figure 2:
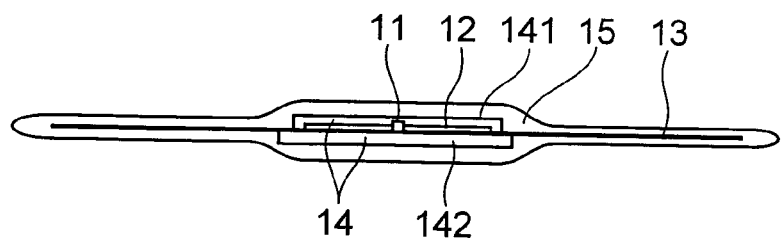
FIG. 2 is a sectional view of the wireless IC tag 1 shown in FIG. 1, which will be described as an embodiment of the present invention.

Embodiments of the present invention will be described in detail in the following. FIG. 1 is a perspective view of a wireless IC tag 1 which will be described as an embodiment of the present invention. FIG. 2 is a sectional view taken along line A-A' of a wireless IC tag 1 in FIG. 1. The wireless IC tag 1 includes an IC chip 11 on which a RFID response circuit and so on are integrated, a first antenna member 12 and a second antenna member 13 as component parts of an antenna 91, and a first protective material 14 and a second protective material 15 for protecting an IC chip and the antenna 91.

Figure 3:
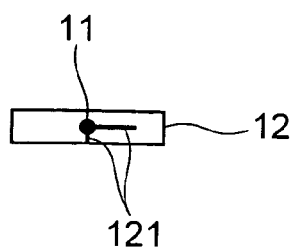
FIG. 3 is a plan view of a first antenna member 12 which will be described as an embodiment of the present invention.

FIG. 3 is a plan view of the first antenna member 12. The first antenna member 12 is a flat, rectangular part with a size of about 2 mm in vertical length by 20 mm in width by 0.2 mm in thickness and is made of a hard material with low toughness, vulnerable to metal fatigue, such as a metal conductor foil like aluminum (Al) and copper (Cu). The IC chip 11 is fixed to about the center of one surface of the first antenna member 12 by an adhesive, such as an anisotropic conductive film or a conductive paste, for example. The IC chip may be fixed at its electrodes to the first antenna member 12 by facing up by ultrasonic waves. In this case, to firmly bond the gold (Au) bump electrodes of the IC chip 11 to the first antenna member 12, the material of the first antenna member 12 is preferably a hard material; for example, if aluminum is used as the material for the first antenna member 12, a physically firmer bonding can be achieved by hard aluminum (Al) than soft aluminum (Al). In the following description, the surface on which the IC chip 11 of the first antenna member 12 on a wireless IC tag 1 is mounted is hereafter referred to as the front surface and the other surface opposite to the front surface is referred to as the rear surface.

In about the center of the first antenna member 12, there is provided a generally L-shaped slit 121 passing through from the front surface to the rear surface of the first antenna member 12, and the slit 121 consists of a slit extending from the IC chip in the longitudinal direction of the first antenna member 12 and another slit extending perpendicularly to the longitudinal direction of the first antenna member 12 and opening at the side end. This slit 121, in combination with a capacitive element formed inside the IC chip 11, functions as an inductor as a component part of a matching circuit for matching impedances between the IC chip 11 and the antenna 91.

Figure 4:
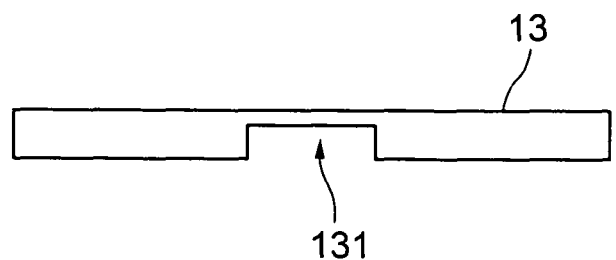
FIG. 4 is a plan view of a second antenna member 13 which will be described as an embodiment of the present invention.

FIG. 4 is a plan view of the second antenna member 13. The second antenna member 13 is a flat, rectangular part in a size of about 3 mm in vertical length by 50 mm in width by 89 μm in thickness, for example. Note that the width of the second antenna member 13 is normally set to be ½ the working wavelength λ of the wireless IC tag 1. In about the center in the longitudinal direction of the second antenna member 13, a rectangular notch 131 is formed which is a little smaller in outline than the first antenna member 12, and which has a wide side parallel with the longitudinal direction of the first antenna member 12.

Figure 5:
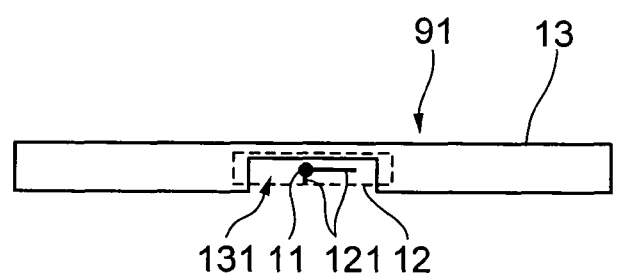
FIG. 5 is a plan view of a symmetric antenna which will be described as an embodiment of the present invention.

The antenna 91 of the wireless IC tag 1 is formed by superposition of the first antenna member 12 and the second antenna member 13, which are in shape as described above. FIG. 5 shows a plan view of the antenna 91 (hereafter referred to as a symmetric antenna) of a wireless IC tag 1 formed as described. When the first antenna member 12 is superposed on the second antenna member 13, take care that the slit 121 of the first antenna member 12 does not overlap the second antenna member 13. The reason is that if the slit portion 121 overlaps the second antenna member 13, the inductance of the inductor formed by the slit 121 will change.

Figure 6:
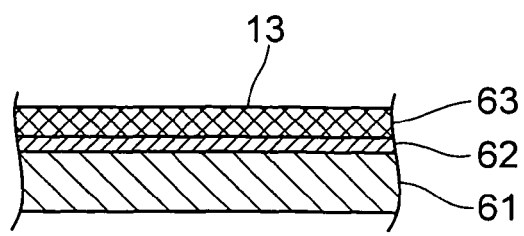
FIG. 6 is a sectional view for explaining a structure of the second antenna member 13 which will be described as an embodiment of the present invention.

FIG. 6 is a sectional view for explaining the structure of the second antenna member 13. As shown in FIG. 6, the second antenna member 13 is a laminated structure (laminated film structure) formed by laminating a CPP layer 61 of non-stretchable polypropylene (CPP: Casting Poly Propylene), a conductor layer 62 of a conductor, and a PET layer 63 of polyethylene terephthalate (PET: Poly Ethylene Terephthalate) in this order, with thicknesses of 70 μm, 7 μm, and 12 μm, respectively. The conductor layer 62 is a conductor foil or a vapor-deposited film of metal, such as aluminum (Al) and copper (Cu), for example. The above-mentioned laminated film structured as described is easy to purchase on the market, such as films manufactured for retortable packages, for example. Incidentally, the second antenna member 13 may be in a structure formed by laminating, for example, an HDPE (High Density Polyethylene) a conductor, and a PET layer in this order, or a CPP layer, a conductor, and a CPP layer in this order, or a CPP layer, a conductor, and a HDPE layer in this order.

The second antenna member 13 in a laminated film structure as described has characteristics of being softer and tougher and more difficult to crease when it is bent than the first antenna member 12. Its laminated film structure ensures tensile strength, tear strength and bursting strength. Therefore, by forming the antenna 91 by superposition of the second antenna member 13 structured as described and the first antenna member 12 of a hard, low-toughness material, and by forming a wireless IC tag 1 using this antenna 91, it is possible to realize a wireless IC tag 1 which, while securely protecting the IC chip 11 and the slit 121 against external forces, provides the longitudinally-extending portion of the antenna 91 with resistance properties against external forces and bending actions. Because the wireless IC tag 1 structured as described is a flat and thin tag, it can be applied not only to clothes but also to a wide range of uses.

Description moves on to the first protective material 14 and the second protective material 15. As shown in a sectional view in FIG. 2, the first protective material 14 includes a first member 141 in rectangular shape for covering the first antenna member 12 from its front surface side, and a second member 142 in rectangular shape for covering the first antenna member 12 from its rear surface side. For materials of the first member 141 and the second member 142, those which have high strength and high heat resistance are used to securely protect the IC chip 11 from external forces and heat, such as polyethylene (melting point 130° C.), polypropylene (melting point 170° C.), polyethylene terephthalate (PET: Poly Ethylene Terephthalate, melting point 250° C.), amorphous polyester (PETG Polyethylene terephthalate Glycol, no melting point), nylon 6 (melting point 225° C.), polyvinyl alcohol (PVA: Poly Vinyl Alcohol, melting point 230° C.), nylon 6,6 (melting point 267° C.). Polytetra fluoroethylene (melting point 327° C.), because of its high resistance to chemicals, is useful especially in applications that the first protective material is located outside of the second protective material. Note that the first protective material 14 may be in a structure that the first member 141 and the second member 142 are put together by heat-sealing.

On the other hand, the second protective material 15 is in a structure that a first sheet, applied to the front surface side of the first antenna member 12, and a second sheet, applied to the rear surface side of the first antenna member 12, are put together by heat sealing. Thus, since the inside of the second protective material 15 is tightly closed by the heat sealing process, water-proofing property can be obtained. For the second protective material 15, any of materials having high flexibility and elasticity and sufficient heat resistance is used, such as urethane-based elastomer, silicon rubber or the like. By using a material with high flexibility and elasticity for the second protective material 15, the antenna 91 can be prevented from being creased when the second protective material 15 is bent by an external force. The second protective material 15 extends along the longitudinal direction of the antenna 91 much longer than the first protective material 14. For this reason, even when the antenna is bent by an external force, the external force is absorbed by the elasticity of the second protective material 15, stresses are less likely to concentrate at the base (fulcrum) portion, making a crease less likely to be formed.

Figure 7A:
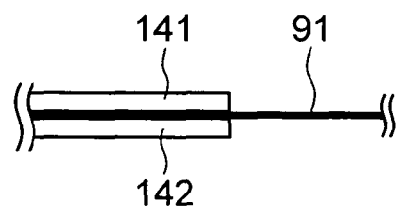
FIGS. 7A, 7B, and 7C are side views of an antenna 91, and a first member 141 and a second member 142 for explaining a position where a crease is formed when the antenna 91 is bent by an external force.
Figure 7B:
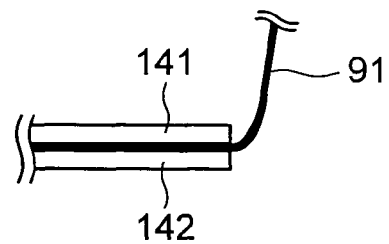
Figure 7C:
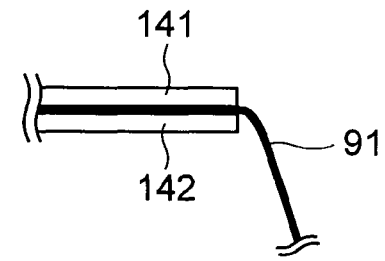
Figure 8A:
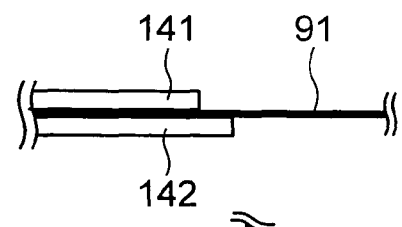
FIGS. 8A, 8B, and 8C are side views of an antenna 91, a first member 141, and a second member 142 according to an embodiment of the present invention for explaining a position where a crease is formed in a case where the first member 141 and the second member 142 are changed in their length of extension in the longitudinal direction of the antenna.
Figure 8B:
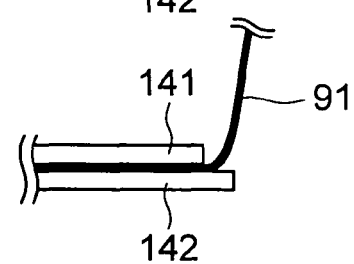
Figure 8C:
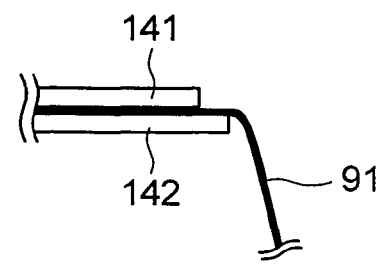

When the second antenna member 13 is bent by an external force, as shown in FIGS. 7A, 7B and 7C, for example, the base portion of the second antenna member 13 contacts the end portion of the first member 141 or the second member 142, causing the base portion to be creased and making the antenna 91 likely to fracture at the crease. To prevent this, it is only necessary to differentiate the lengths of the longitudinally extending portions of the first member 141 and the second member 142 of the antenna 91, for example. More specifically, by so doing, when the second antenna member 13 is bent, the portion where a crease is formed differs with a direction in which the second antenna member 13 is bent, with the result that creases are prevented from concentrating at a specific part of the antenna 91 (See FIGS. 8A, 8B and 8C), and the bending resistance of the antenna 91 can be increased.

Figure 9:
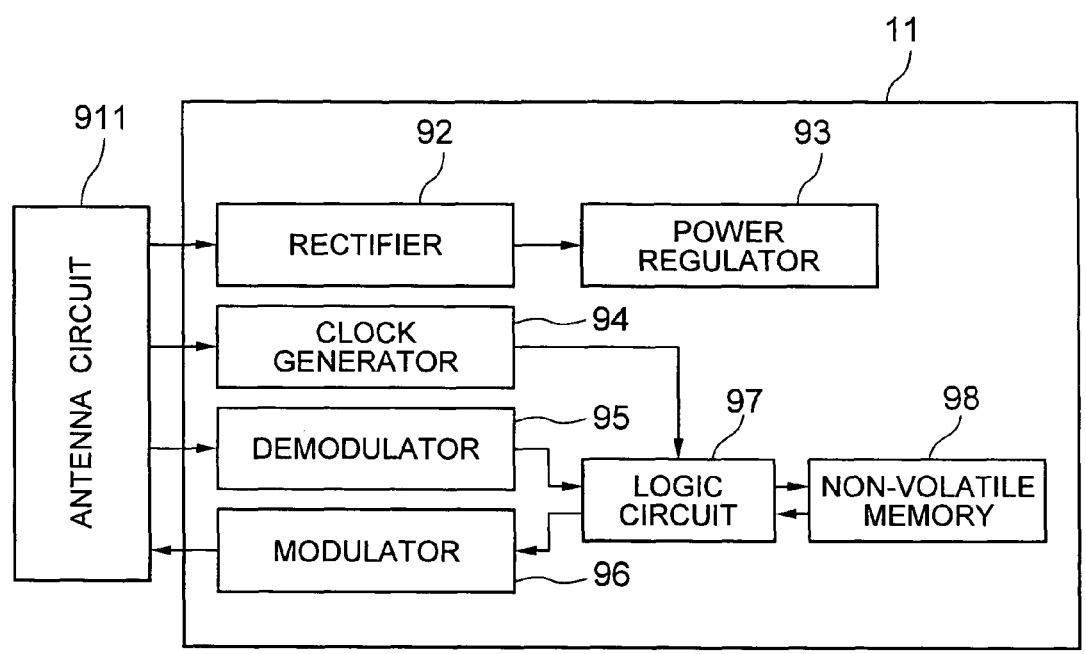
FIG. 9 is a block diagram of a circuit integrated in an IC chip 11 which will be described as an embodiment of the present invention.

The IC chip 11 fixed to the first antenna member 12 has circuits formed on a silicon substrate, such as a communication circuit and a non-volatile memory. FIG. 9 is a block diagram of circuits concentrated on an IC chip 11. As illustrated in FIG. 9, the circuits concentrated on the IC chip 11 are an antenna circuit 911, a rectifier circuit 92, a power regulator 93, a clock generator circuit 94, a demodulator circuit 95, a modulator circuit 96, a logic circuit 97, and a non-volatile memory 98. The circuits shown in FIG. 9 operate as described below, for example. When an interrogation signal from the interrogator unit is received at the antenna circuit 911, electromotive force is generated in the antenna circuit 911 by the received signal. Part of the electromotive force is rectified by the rectifier circuit 92 to supply drive power for the wireless IC tag 1. Some other part of the electromotive force is supplied to the clock generator circuit 94 which generates a clock signal to operate the logic circuit 97, for example. On the other hand, the received signal from the antenna circuit 911 is demodulated by the demodulator circuit 95, and based on the demodulated signal, the logic circuit 97 reads information stored on the non-volatile memory 98. The read-out information is supplied to the modulator circuit 96 from the logic circuit 97, and a modulated signal from the modulator circuit 96 is transmitted by the antenna circuit 911 as a reply signal to the outside.

Figure 10:
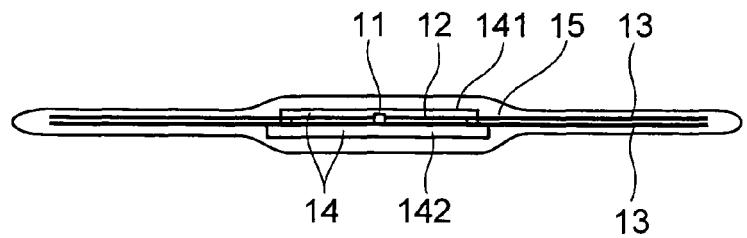
FIG. 10 is a sectional view of a wireless IC tag which will be described as an embodiment of the present invention.

FIG. 10 is a sectional view of a wireless IC tag 1 shown as another embodiment of the present invention, obtained by modifying the wireless IC tag 1 in the structure illustrated in FIGS. 1 and 2. In this embodiment, two pieces of the second antenna member 13 are used. By laminating second antenna members in a laminated structure as in this case, the strength of the antenna 91 against external forces can be increased. As ways of superposing a second antenna member 13 and a first antenna member 12 in a case where two pieces of the second antenna member 13 are used, there are, for example, a method of pinching a first antenna 12 between two second antenna members 13 (FIG. 11A), a method of placing a two-ply structure of second antenna members 13 on the front surface side of a first antenna member 12 (FIG. 11B), and a method of placing a two-ply structure of second antenna members 13 on the rear surface side of the first antenna member 12 (FIG. 11C).

The wireless IC tag 1 may be formed in such a way that the second protective material 15 covers only the circumference of the first protective material 14 as shown in FIG. 12. In this case, too, since the base portion of the second antenna member 13 is protected by the soft second protective material 15, the second antenna member 13 is less liable to be creased and therefore it is possible to securely protect the IC chip 11 and the slit 121 from external forces and provide the longitudinally extending portion of the antenna 91 with resistance to bending. Moreover, since the portions not protected by the second protective material 15 can be made thin, this wireless IC tag 1 can be used in a wider range of application when the thickness is much of problem. Incidentally, in a wireless IC tag 1 structured as shown in FIG. 12, the second antenna member 13 may be used in a two-ply structure as shown in FIG. 13.

Figure 14:
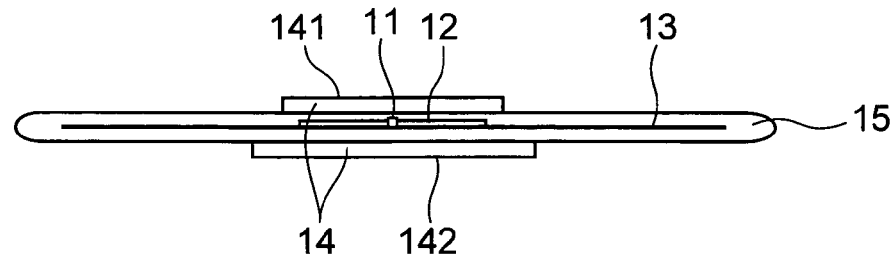
FIG. 14 is a sectional view of a wireless IC tag 1 formed in such a way that the first protective material 14 is provided on the outer circumference of the second protective material 15, which will be described as an embodiment of the present invention.

The wireless IC tag 1 shown in FIG. 14 is built by reversing the order of laminating the first protective material 14 and the second protective material 15 from the order in the preceding examples. More specifically, the first protective material 14 is located outside of the second protective material 15. As for the method of laminating the first protective material 14 and the second protective material 15, there can be many variations depending on specifications and usages of the wireless IC tag 1.

Figure 15:
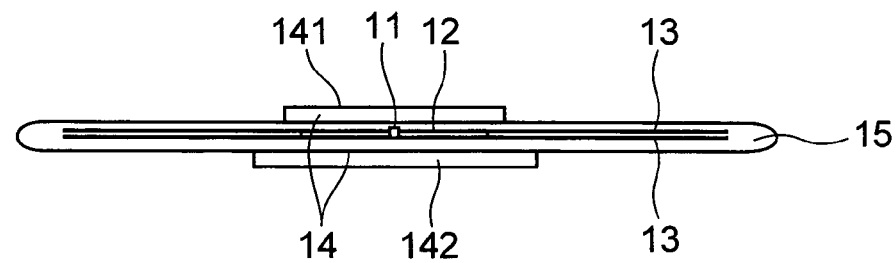
FIG. 15 is a sectional view of a wireless IC tag 1 which is formed by using two pieces of the second antenna member 13 in the wireless IC tag 1 of the structure shown in FIG. 14, and which will be described as an embodiment of the present invention.
Figure 16:
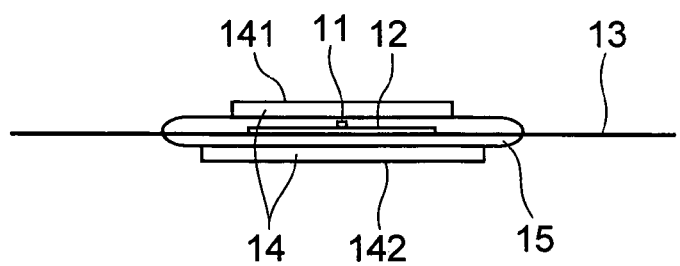
FIG. 16 is a sectional view of a wireless IC tag 1 shown in FIG. 14 and formed in such a way that the second protective material 15 is wider than the first protective material 14 which covers a shorter portion of the second protective material 15 in a direction of the second antenna member 13.
Figure 17:
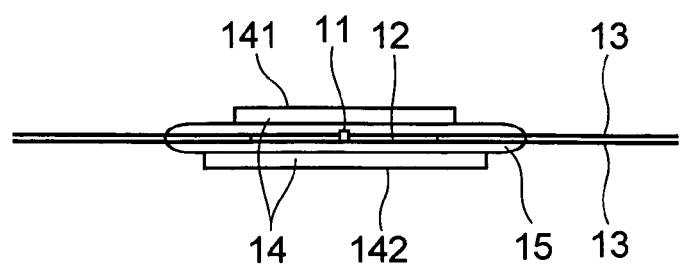
FIG. 17 is a sectional view of a wireless IC tag 1 formed by using two pieces of the second antenna member 13 in the wireless IC tag 1 of the structure shown in FIG. 16, which will be described as an embodiment of the present invention.

The wireless IC tag 1 shown in FIG. 15 is formed by using two second antenna members 13 in the wireless IC tag 1 of the structure shown in FIG. 14. The wireless IC tag 1 shown in FIG. 16 is formed in such a way that the second protective material 15 is wider than the first protective material 14 which covers a shorter portion of the second protective material 15 in a direction of the second antenna member 13 in the wireless IC tag 1 shown in FIG. 15. The wireless IC tag 1 shown in FIG. 17 is formed by using two second antenna member 13 in the wireless IC tag 1 of the structure shown in FIG. 16.

Figure 18:
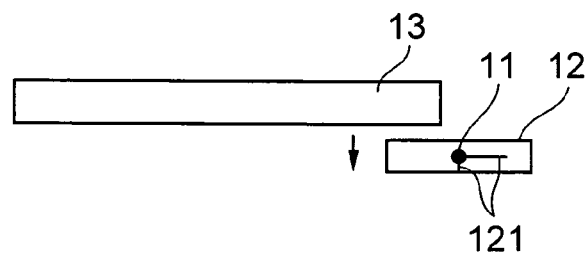
FIG. 18 is a plan view of a second antenna member 13, which will be described as an embodiment of the present invention.
Figure 19:
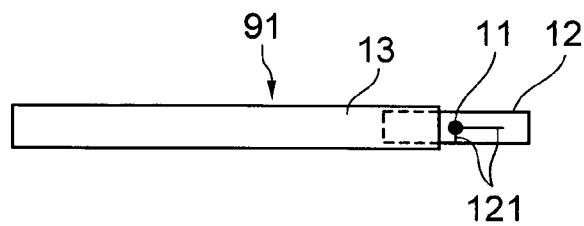
FIG. 19 is a plan view of an asymmetric antenna, which will be described as an embodiment of the present invention.

Incidentally, besides the symmetric antennas described above, the antenna 91 may be formed in a structure shown in FIG. 18, for example. The second antenna member 13 shown in FIG. 18 is a flat, rectangular part in a size of about 3 mm in vertical length by 45 mm in width by 89 µm in thickness, for example. Note that the second antenna member 13 in FIG. 18 is not provided with a slit 121 unlike in a symmetric antenna. As shown in FIG. 19 for example, the antenna 91 using the second antenna member 13 shown in FIG. 18 is formed by superposing the first antenna member 12 and the second antenna member 13 so that their longitudinal directions are parallel to each other by moving the first antenna member 12 structured as shown in FIG. 3 from one end of the longitudinal direction of the second antenna member 13 shaped as shown in FIG. 18, and that the portion where the IC chip 11 and the matching circuit are provided does not overlap the antenna member 13.

Figure 20:
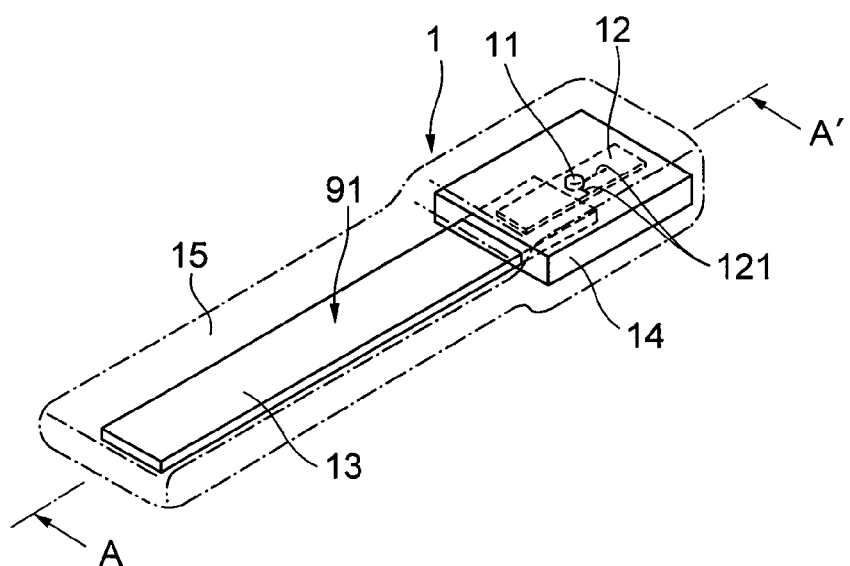
FIG. 20 is a perspective view of a wireless IC tag 1 formed by using an asymmetric antenna, which will be described as an embodiment of the present invention.
Figure 21:
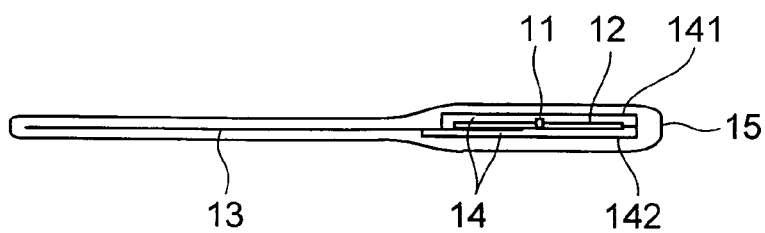
FIG. 21 a sectional view of a wireless IC tag 1 formed by using the asymmetric antenna, which will be described as an embodiment of the present invention.

The IC tag1 shown in FIGS. 20 and 21 is an example of a wireless IC tag 1 formed by an antenna 91 shown in FIG. 19 (hereafter referred to as an asymmetric antenna). Note that FIG. 20 is a perspective view of the wireless IC tag 1, and FIG. 21 is a sectional view taken along line A-A' of the wireless IC tag 1 of FIG. 20.

Figure 22:
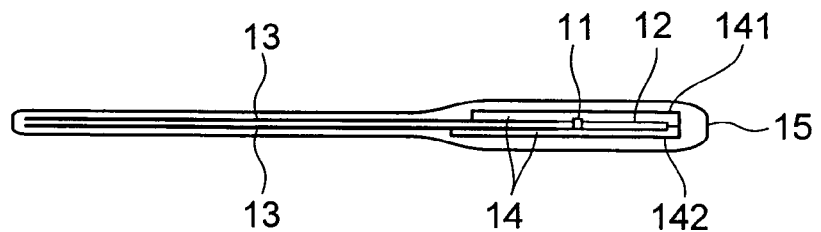
FIG. 22 is a sectional view of a wireless IC tag 1 formed by using two pieces of the second antenna member 13 in the wireless IC tag 1 with the asymmetric antenna, which will be described as an embodiment of the present invention.
Figure 23:
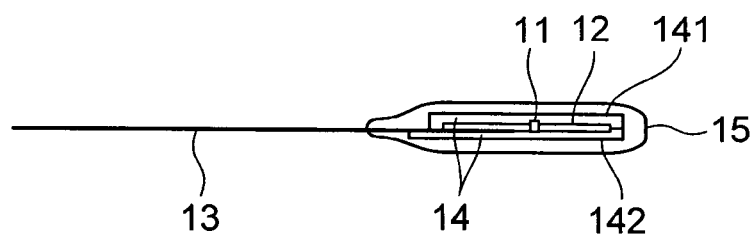
FIG. 23 is a sectional view of a wireless IC tag 1 formed in such a way that the second protective material 15 covers only the circumference of the first protective material 14 in the wireless IC tag 1 using the asymmetric antenna, which will be described as an embodiment of the present invention.
Figure 24:
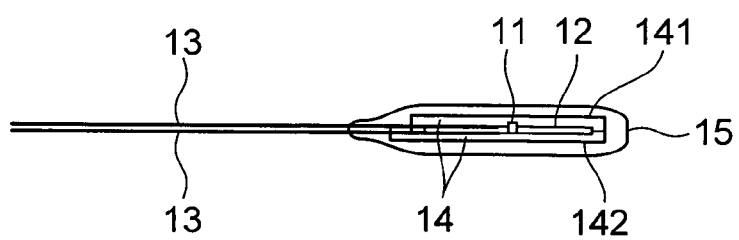
FIG. 24 is a sectional view of a wireless IC tag 1 formed by using two pieces of the second antenna member 13 in the wireless IC tag 1 shown in FIG. 23, which will be described as an embodiment of the present invention.
Figure 25:
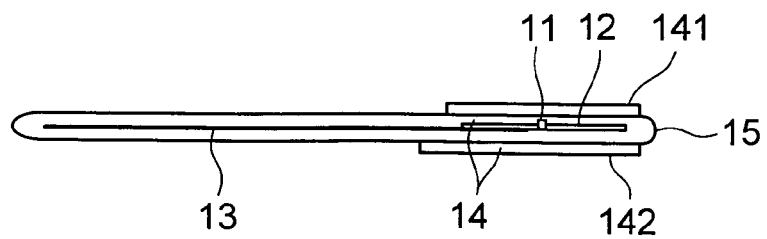
FIG. 25 is a sectional view of a wireless IC tag 1 formed by providing the first protective material 14 on the outer circumference of the second protective material 15 in a wireless IC tag 1 using an asymmetric antenna, which will be described as an embodiment of the present invention.
Figure 26:
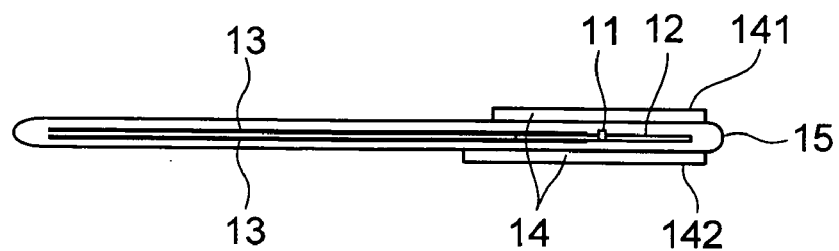
FIG. 26 is a sectional view of a wireless IC tag 1 formed by using two pieces of the second antenna member 13 in the wireless IC tag 1 in FIG. 25, which will be described as an embodiment of the present invention.
Figure 27:
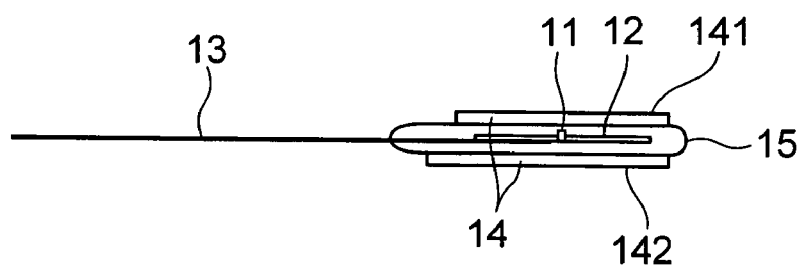
FIG. 27 is a sectional view of a wireless IC tag 1 shown in FIG. 25 and formed in such a way that the second protective material 15 is wider than the first protective material 14 which covers a shorter portion of the second protective material 15 in a direction of the second antenna member 13.
Figure 28:
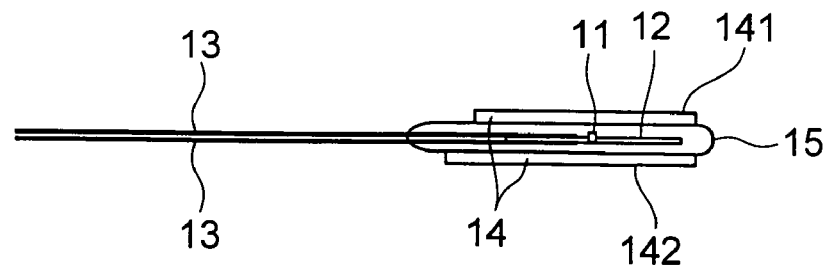
FIG. 28 is a sectional view of a wireless IC tag 1 formed by using two pieces of the second antenna member 13 in the wireless IC tag 1 shown in FIG. 27, which will be described as an embodiment of the present invention.

Also for the wireless IC tag 1 using an asymmetric antenna, various variations are possible in forming the antenna structure as in the symmetric antenna. For example, the wireless IC tag 1 shown in FIG. 22 is formed by providing two second antenna members 13 in a wireless IC tag 1 using an asymmetric antenna. The wireless IC tag 1 shown in FIG. 23 is a case where the second protective material 15 covers only the circumference of the first protective material 14 in the wireless IC tag 1 shown in FIG. 21. The wireless IC tag 1 shown in FIG. 24 is formed by using two second antenna members 13 in the wireless IC tag 1 shown in FIG. 23. In a wireless IC tag 1 shown in FIG. 25, the first protective material 14 is provided on the outer circumference of the second protective material 15. The wireless tag 1 shown in FIG. 26 uses two second antenna members 13 in the wireless IC tag 1 shown in FIG. 25. A wireless IC tag 1 shown in FIG. 27 is formed in such a way that the second protective material 15 is wider than the first protective material 14 which covers a shorter portion of the second protective material 15 in a direction of the second antenna member 13 in the wireless IC tag 1 shown in FIG. 25. In addition, a wireless IC tag 1 shown in FIG. 28 is formed by using two second antenna members 13 in the wireless IC tag 1 shown in FIG. 27.

Figure 29A:
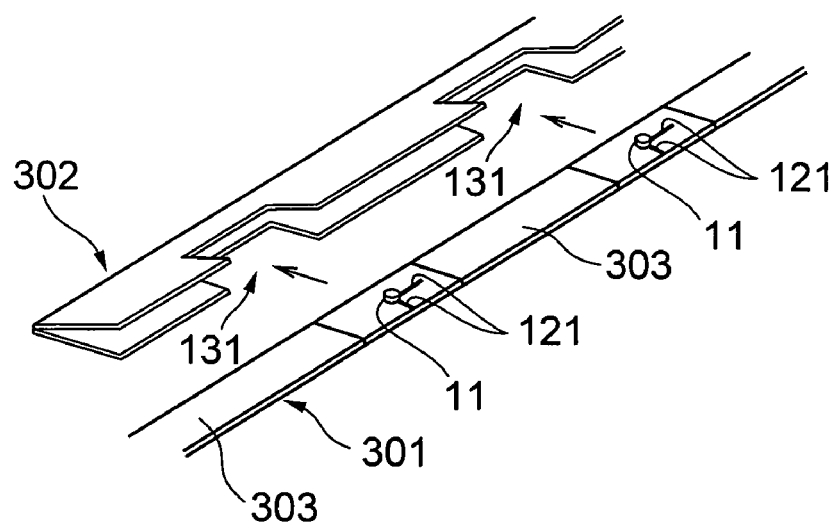
FIGS. 29A and 29B are diagrams for explaining a method for manufacturing a symmetric antenna, which will be described as an embodiment of the present invention.
Figure 29B:
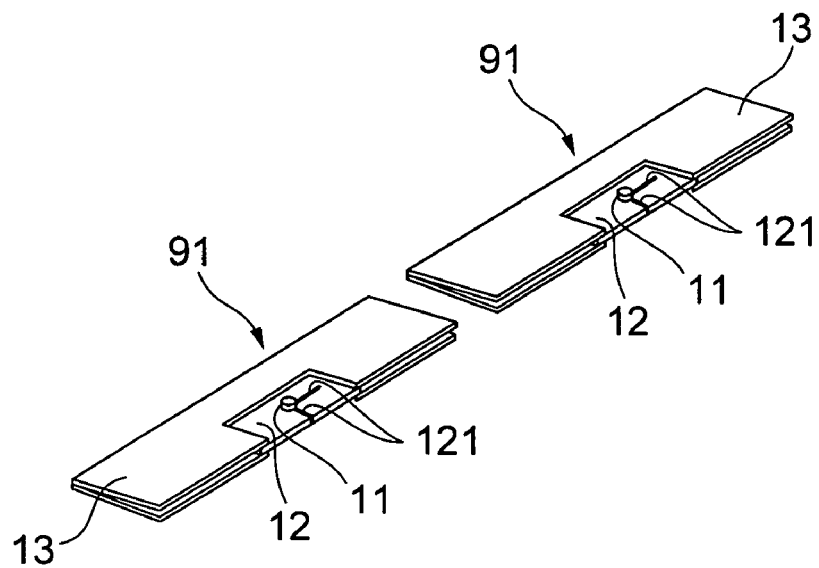

Then, description will be made of a method for manufacturing the symmetric and the asymmetric antennas described above. FIGS. 29A and 29B show an example of the method for manufacturing the symmetric antenna. In this method, a first material 301 in a tape form having slits 121 formed at predetermined intervals along the longitudinal direction of the first material is superposed onto a second material 302 folded along a center line in the longitudinal direction of said second material and having rectangular notches 131 formed symmetrically at predetermined intervals, each notch having wide sides parallel with the longitudinal direction of the second material, said superposition being carried out in such a manner that the first material 301 closes each notch 131 and each slit 121 does not overlap the second material (FIG. 29A). Then, the superposed first material 301 and second material 302 are cut off so that the notches 131 may be separated from one another, and thus symmetric antennas are obtained (FIG. 29B).

Figure 30A:
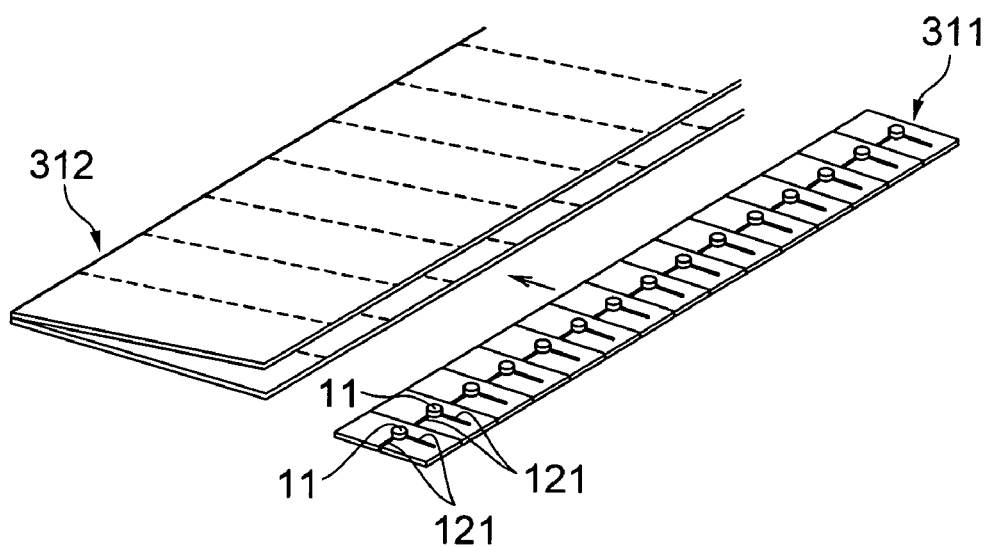
FIGS. 30A and 30B are diagrams for explaining a method for manufacturing an asymmetric antenna, which will be described as an embodiment of the present invention.
Figure 30B:
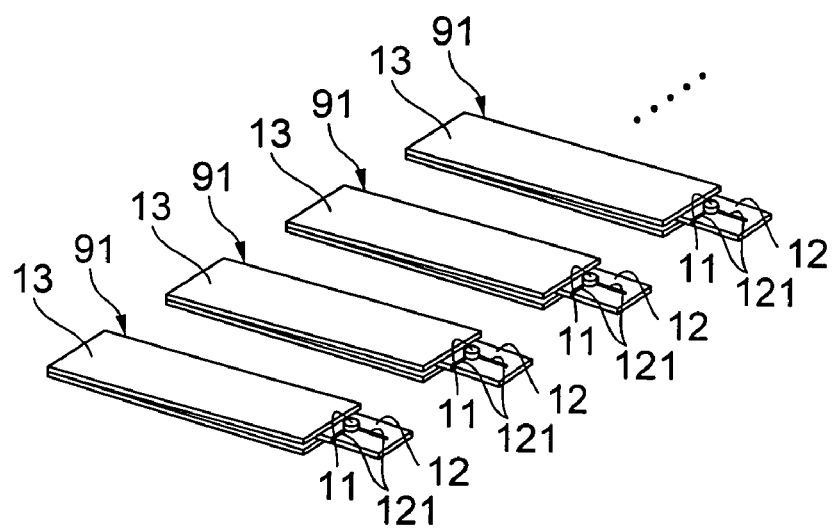

On the other hand, FIG. 30 shows an example of a method for manufacturing an asymmetric antenna. In this method, a first material 311 in a tape shape having a plurality of slits 121 formed in a direction perpendicularly to the longitudinal direction of a second material 312 is inserted into a second material 312 in a tape shape folded along the center line in the longitudinal direction of the second material, and then the first material 311 and the second material 312 are superposed in such a manner that the slits 121 do not overlap the second material 312 and that the wide sides of the first material 311 and of the second material 312 are parallel to each other (FIG. 30A). Then, the superposed first material 311 and second material 312 are cut into rectangular strips in such a manner that the respective slits 121 are separated from one another and the longitudinal direction portion of the second material 312 becomes short sides of the antennas (FIG. 30B).

In the above-mentioned method for manufacturing symmetric antennas, by moving the first material 301 or the second material 302 in the direction of the short sides of the first antenna members 12, the first material 301 and the second material 302 are positioned. On the other hand, in the case of the asymmetric antennas, by moving the first material 311 or the second material 312 in the direction of the wide sides of the first antenna members 12, the first material 311 and the second material 312 are positioned. Therefore, permissible error is larger for asymmetric antennas, which are adjusted by being moved in the longitudinal direction of the first antenna members 12, than for symmetric antennas, with the result that the asymmetric antennas can be positioned more easily than the symmetric antennas. In the above-mentioned symmetric antenna manufacturing method, an intervening resin 303 is needed to couple the adjacent second antenna members 13 together. On the other hand, the asymmetric antenna manufacturing method does not require this resin and offers better chances for savings in material cost than in the symmetric antenna manufacturing method.

The embodiments of the present invention have been described in detail, but the above description of the embodiments is to facilitate understanding of the present invention, but not to limit the scope of the present invention. Needless to say, the present 20, invention can be altered or modified without departing from the spirit of the present invention and includes all its equivalents.

For example, the first protective material 14 may be formed by potting a resin, such as epoxy resin.

Figure 31:
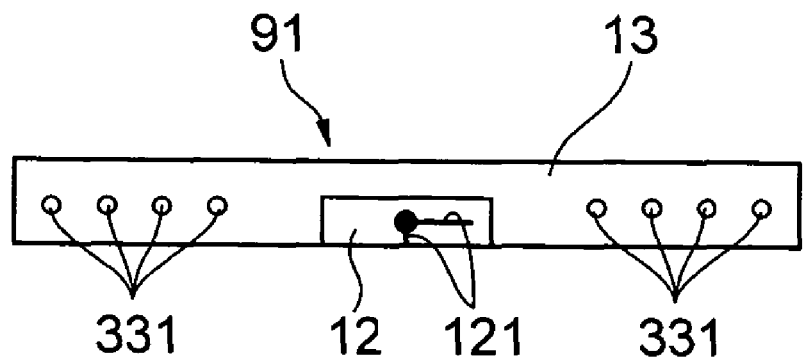
FIG. 31 is a plan view of a symmetric antenna provided with antislip holes 331, which will be described as an embodiment of the present invention.
Figure 32:
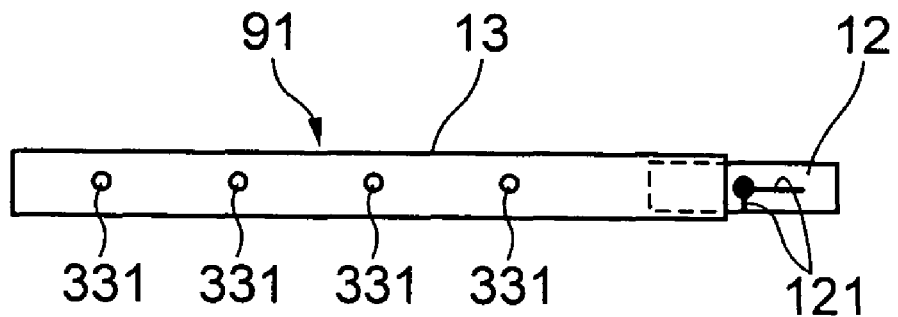
FIG. 32 is a plan view of an asymmetric antenna provided with antislip holes 331, which will be described as an embodiment of the present invention.

If the second protective material 15 is expanded as a large external force is applied to the end portion of it, the antenna 91 difficult to expand or contract remains almost unchanged in length, but only the second protective material 15 is expanded, and when the external force disappears and the second protective material 15 shrinks, the antenna 91 is sometimes deformed in a wavy form as it is dragged by the second protective material 15. This deformation can be prevented by providing holes at predetermined intervals in the longitudinal direction of the antenna 91 (the holes are referred to as antislip holes 331), and filling the second protective material 15 into the holes to thereby interconnect the front surface side and the rear surface side of the second protective material 15. In other words, by the means described above, even if an external force acts on the second protective material 15, the second protective material is expanded only at its end portion, that portion of the second protective material 15 which is filled in the antislip holes 331 hardly expands, with the result that even when the second protective material 15 contracts, the antenna 91 is not dragged, offering no chances of deformation as described above. FIG. 31 shows a plan view of a symmetric antenna with the antislip holes 331, and FIG. 21 also shows a plan view of an asymmetric antenna with the antislip holes 331.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A wireless IC tag, comprising:
    an IC chip including a response circuit for receiving a signal sent from an interrogator and transmitting a response signal;
    a rectangular antenna connected to the response circuit;
    a first protective material having a hard to bend characteristic, for covering the IC chip; and
    a second protective material having an easier to bend characteristic than the first protective material, for covering at least a part of the antenna;
    wherein the antenna has a structure formed by superposing a pair of flat members including a first antenna member connected to the IC chip and a second antenna member, the second antenna member being arranged to be softer, tougher and more difficult to crease when bent than the first antenna member,
    wherein the second antenna member is longer than the first antenna member;
    wherein the first antenna member is provided with a slit serving as a matching circuit to match impedance between the antenna and the response circuit; and
    wherein the first antenna member is superposed on the second antenna member in such a manner that the slit of the first antenna member does not overlap the second antenna member.

2. The wireless IC tag according to claim 1, wherein a length of the second antenna member is half of a wavelength of a radio wave to be handled by the antenna.

3. The wireless IC tag according to claim 1, wherein the second protective material extends longer than the first protective material to the outside in the longitudinal direction of the first antenna member and the second antenna member, the first protective material including a first member on one side of the IC chip and a second member on the opposite side of the IC chip, the length of the first member and the second member being arranged to be different from each other in the longitudinal direction of the antenna.

4. The wireless IC tag according to claim 1, wherein the second protective material is provided on an outer surface of the first protective material.

5. The wireless IC tag according to claim 1, wherein the second protective material is provided so as to cover the entire second antenna member.

6. The wireless IC tag according to claim 1, wherein the first protective material comprises:
    a first member in a flat-plate shape provided on a front surface side of the antenna, and
    a second member in a flat-plate shape provided on a rear surface side of the antenna,
    wherein the first member and the second member differ in the length extending to the outside in the longitudinal direction of the antenna.

7. The wireless IC tag according to claim 1, wherein the first protective material is at least one of polyethylene, polyethylene terephthalate, amorphous polyester, nylon 6, polyvinyl alcohol, polypropylene, nylon 6, 6, polytetra fluoroethylene, and epoxy resin.

8. The wireless IC tag according to claim 1, wherein the second protective material is at least one of urethane-based elastomer and silicon rubber.

9. The wireless IC tag according to claim 1, wherein the second protective material extends longer than the first protective material to the outside in the longitudinal direction of the second antenna member, the first protective material including a first member on one side of the IC chip and a second member on the opposite side of the IC chip, the length of the first member and the second member being arranged to be different from each other in the longitudinal direction of the antenna.

10. The wireless IC tag according to claim 1, wherein the antenna has a laminated film structure of a conductor layer and a resin layer.

11. The wireless IC tag according to claim 10, wherein the conductor layer is at least one of a conductor foil and a vapor deposited conductor film.

12. The wireless IC tag according to claim 11, wherein the conductor layer is a layer made of at least one of aluminum, copper and silver.

13. The wireless IC tag according to claim 10, wherein the resin layer is a layer made of at least one of non-stretchable polypropylene, polyethylene terephthalate, and high density polyethylene.

14. The wireless IC tag according to claim 10, wherein the laminated film structure is at least one of a structure formed by laminating a casting poly-propylene (CPP) layer of non-stretchable polypropylene, a conductor layer, and a polyethylene terephthalate (PET) layer of polyethylene terephthalate, a structure formed by laminating a high density polyethylene (HDPE) layer, and a PET layer, a structure formed by laminating a CPP layer, a conductor layer, and a CPP layer, and a structure formed by laminating a CPP layer, a conductor layer, and a HDPE layer.

15. A wireless IC tag, comprising:
    an IC chip including a response circuit for receiving a signal sent from an interrogator and transmitting a response signal;
    a rectangular antenna connected to the response circuit;

a first protective material having a hard to bend characteristic, for covering the IC chip; and
a second protective material having an easier to bend characteristic than the first protective material, for covering at least a part of the antenna;
wherein the antenna has a structure formed by superposing a pair of flat members including a first antenna member connected to the IC chip and a second antenna member, the second antenna member being arranged to be softer, tougher and more difficult to crease when bent than the first antenna member,
wherein the second antenna member is longer than the first antenna member;
wherein the antenna has a laminated film structure of a conductor layer and a resin layer;
wherein the laminated film structure is at least one of a structure formed by laminating a casting poly-propylene (CPP) layer of non-stretchable polypropylene, a conductor layer, and a poly-ethylene terephthalate (PET) layer of polyethylene terephthalate, a structure formed by laminating a high density polyethylene (HDPE) layer, and a PET layer, a structure formed by laminating a CPP layer, a conductor layer, and a CPP layer, and a structure formed by laminating a CPP layer, a conductor layer, and a HDPE layer; and
wherein a slit is formed in the center of the first antenna member, a notch is formed in the center of the second antenna member, and the first antenna member is superposed on the second antenna member in such a manner that the slit does not overlap the notch.

16. The wireless IC tag according to claim 14, wherein the first antenna member is superposed on an end portion in the longitudinal direction of the second antenna member.

17. The wireless IC tag according to claim 14, wherein a plurality of the second antenna members are superposed on the first antenna member.

18. The wireless IC tag according to claim 1, wherein the first protective material or the second protective material is in a structure formed by bonding sheet-like materials together by a heat-sealing process.

19. The wireless IC tag according to claim 2, wherein the first protective film or the second protective film is in a structure formed by bonding sheet-like materials together by a heat-sealing process.

20. The wireless IC tag according to claim 19, wherein said rectangular antenna is provided with a plurality of through-holes at predetermined intervals, and one portion of said second protective material which covers the front surface side of said antenna and the other portion of said second protective material which covers the rear surface side of said rectangular antenna are interconnected by said second protective material filled in said through-holes.

21. A method for manufacturing an antenna of a superposed structure of a first antenna member in a rectangular shape and a second antenna member in a rectangular shape for use in a wireless IC tag including a response circuit for receiving a signal sent from an interrogator and transmitting a response signal in response to said signal, said method comprising the steps of:
superposing a first material in a tape shape onto a second material folded along a center line in the longitudinal direction of the second material to cover the first antenna member of the antenna, the first material having slits formed symmetrically at predetermined intervals in the longitudinal direction of the first material, the second material having rectangular notches formed symmetrically at predetermined intervals, each notch having wide sides parallel with the longitudinal direction of the second material, and said superposition being carried out in such a manner that the first material closes each notch and each slit does not overlap the second material; and
cutting off said superposed first material and second material into rectangular strips so that said notches are separated from one another.

22. A method for manufacturing an antenna of a superposed structure of a first antenna member in a rectangular shape and a second antenna member in a rectangular shape for use in a wireless IC tag including a response circuit for receiving a signal sent from an interrogator and transmitting a response signal in response to said signal, said method comprising the steps of:
inserting a first material in a tape shape having slits formed therein into a second material in a tape shape folded along a center line in the longitudinal direction of said second material so as to cover the first antenna member of the antenna, and superposing said first material and said second material in such a manner that said slits do not overlap said second material and that said wide sides of said first material and said second material are parallel to each other; and
cutting said superposed first material and second material into rectangular strips in such a manner that respective strips are separated from one another and said longitudinal portion of said second material becomes short sides of antennas.

* * * * *